(12) United States Patent
Prasad et al.

(10) Patent No.: US 9,840,253 B1
(45) Date of Patent: Dec. 12, 2017

(54) LANE KEEPING SYSTEM FOR AUTONOMOUS VEHICLE DURING CAMERA DROP-OUTS

(71) Applicant: DELPHI TECHNOLOGIES, iNC., Troy, MI (US)

(72) Inventors: Premchand Krishna Prasad, Carmel, IN (US); Jeremy S. Greene, McCordsville, IN (US); Paul R. Martindale, Carmel, IN (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 1 day.

(21) Appl. No.: 15/181,915

(22) Filed: Jun. 14, 2016

(51) Int. Cl.
| | | |
|---|---|---|
| *A01B 69/00* | (2006.01) | |
| *B62D 6/00* | (2006.01) | |
| *G05D 1/00* | (2006.01) | |
| *G06F 7/00* | (2006.01) | |
| *B60W 30/12* | (2006.01) | |
| *B62D 15/02* | (2006.01) | |

(52) U.S. Cl.
CPC .......... B60W 30/12 (2013.01); B62D 15/025 (2013.01); *B60W 2420/42* (2013.01); *B60W 2420/52* (2013.01); *B60W 2710/18* (2013.01); *B60W 2710/20* (2013.01); *B60W 2710/22* (2013.01)

(58) Field of Classification Search
None
See application file for complete search history.

(56) References Cited

U.S. PATENT DOCUMENTS

| | | | | |
|---|---|---|---|---|
| 6,173,222 B1* | 1/2001 | Seo | ........................... | B62D 1/28 180/421 |
| 6,317,057 B1* | 11/2001 | Lee | ....................... | G05D 1/0246 340/435 |
| 6,980,663 B1* | 12/2005 | Linhard | .............. | G10L 21/0208 381/77 |
| 8,403,213 B1* | 3/2013 | Gromley | ............... | G07F 19/209 235/375 |
| 9,171,363 B2* | 10/2015 | Suzuki | ....................... | G06T 7/00 |
| 9,542,847 B2* | 1/2017 | Sherony | ................. | G08G 1/167 |
| 2002/0171844 A1* | 11/2002 | Hill | ...................... | G03F 7/70775 356/500 |
| 2005/0187684 A1* | 8/2005 | Hijikata | ............... | B60N 2/6009 701/45 |
| 2007/0078594 A1* | 4/2007 | Mori | ....................... | G01C 21/00 701/408 |
| 2012/0109462 A1* | 5/2012 | Hong | ................. | B62D 15/0265 701/41 |

(Continued)

*Primary Examiner* — Nicholas Kiswanto
*Assistant Examiner* — Kenny A Taveras
(74) *Attorney, Agent, or Firm* — Lawrence D. Hazelton

(57) ABSTRACT

An environmental sensing system relating to vehicle lane position includes first and second sensors respectively configured to provide first and second signals indicative of a vehicle lane position. A steering system achieves a desired lane position in response to a command from a controller to keep the vehicle in its lane, for example, during autonomous control of the vehicle. The controller uses the first signal if the first sensor provides a desired lane marker confidence. The controller switches to the second sensor and uses the second signal if the first sensor cannot provide the desired lane marker confidence and the second sensor can provide the desired lane marker confidence.

20 Claims, 4 Drawing Sheets

(56) References Cited

U.S. PATENT DOCUMENTS

| | | | |
|---|---|---|---|
| 2013/0208945 A1* | 8/2013 | Nunn | G06K 9/00798 382/103 |
| 2014/0018995 A1* | 1/2014 | Ferguson | G06K 9/00798 701/25 |
| 2014/0049646 A1* | 2/2014 | Nix | B60R 1/002 348/148 |
| 2014/0052340 A1* | 2/2014 | Bajpai | B62D 6/00 701/42 |
| 2014/0156178 A1* | 6/2014 | Yoo | G01C 21/32 701/409 |
| 2014/0168377 A1* | 6/2014 | Cluff | G06T 7/85 348/47 |
| 2015/0103173 A1* | 4/2015 | Takaki | B60R 11/04 348/148 |
| 2015/0109131 A1* | 4/2015 | Lindberg | G08B 21/06 340/576 |
| 2015/0183430 A1* | 7/2015 | Schwindt | B60W 30/12 701/23 |
| 2015/0341620 A1* | 11/2015 | Han | H04N 5/2355 701/37 |
| 2016/0306357 A1* | 10/2016 | Wieskamp | B62D 15/0265 |
| 2016/0307441 A1* | 10/2016 | Wieskamp | G06K 9/00798 |
| 2016/0341555 A1* | 11/2016 | Laur | G01C 21/20 |
| 2016/0363665 A1* | 12/2016 | Carlson | G01S 13/931 |
| 2017/0028916 A1* | 2/2017 | Schofield | B60Q 1/346 |
| 2017/0057545 A1* | 3/2017 | Laur | B62D 15/0265 |

* cited by examiner

LANE KEEPING SYSTEM FOR AUTONOMOUS VEHICLE DURING CAMERA DROP-OUTS

BACKGROUND

This disclosure relates to an environmental sensing system relating to reliably identifying vehicle lane position for lane keeping in a fully autonomous vehicle, for example, or a vehicle that is driver-assisted.

Vehicle lane position is increasingly used in modern vehicles for such features as Lane Keep Assist (LKA), Lane Centering (LC) and Traffic Jam Assist (TJA), which incorporates aspects of LKA and LC. During operation, the vehicle's lane position is detected, and the vehicle is maintained within the lane using little or no steering input from the driver. Such features are also needed for autonomously driving vehicles.

In one typical approach, the vehicle's lane position is adjusted by using an environmental sensing system that has one or more cameras and a distance ranging sensor (e.g., LIDAR or radar). Lane marker edges are detected by the sensors, but some sort of vision-based sensor is used as the primary sensor for vehicle control, typically in the form of a front mounted camera which detects the lines and lanes.

Data from the sensors must be reliable in order to maintain control of the vehicle without driver input, or full control of the vehicle must be returned to the driver. Repeated interruptions to autonomous control are undesirable, but must be balanced with the need for highly reliable vehicle control.

One reason for which the current systems "turn off" or hand control back to the driver are that the lane markers are poorly marked with fading paint that cannot be distinguished from the road. Another reason is that sun glare on the front facing sensors can be sufficient to cause sensor "drop-out" in which the sensor can no longer provide reliable data for vehicle control. One approach to address sun glare is to combine overlapping or non-overlapping images from multiple cameras to provide the best available lane marker recognition. The problem with this approach is that the primary sensor may no longer be relied upon for indefinite durations, which is not the best practice and not very reliable.

SUMMARY

In one exemplary embodiment, a method of sensing an environment of a vehicle. The method includes the steps of controlling a vehicle lane position based upon a first signal from a first sensor and switching from the first sensor to a second sensor if the first sensor cannot provide a desired lane marker confidence. The vehicle's lane position is controlled based upon a second signal from the second sensor if the second sensor can provide the desired lane marker confidence and a predetermined time has not been exceeded.

In a further embodiment of the above, the first sensor is at least one of a camera sensor, radar sensor, infrared sensor and LIDAR sensor.

In a further embodiment of any of the above, the first sensor is an integrated camera sensor and radar sensor.

In a further embodiment of any of the above, the first sensor is forward facing.

In a further embodiment of any of the above, the second sensor is one of a side view camera and a rear view camera.

In a further embodiment of any of the above, the first sensor cannot provide the desired lane marker confidence due to glare on the first sensor.

In a further embodiment of any of the above, the switching step includes applying a control algorithm using data from the second signal to determine the desired lane marker confidence.

In a further embodiment of any of the above, the switching step includes applying a filter to the data to identify lane marker edges and converting the lane marker edges to a coordinate system.

In a further embodiment of any of the above, the switching step includes determining whether the lane marker edges in the coordinate system are similar to previously provided data from the first sensor.

In a further embodiment of any of the above, steering control of the vehicle is returned to the driver if the step of controlling the vehicle lane position based upon the second signal is not performed within the predetermined time.

In a further embodiment of any of the above, the vehicle lane position is not controlled based upon the first signal while controlling the vehicle lane position based upon the second signal.

In another exemplary embodiment, an environmental sensing system relating to vehicle lane position includes a first sensor that is configured to provide a first signal indicative of a vehicle lane position. A second sensor is configured to provide a second signal indicative of the vehicle lane position. A steering system is configured to achieve a desired lane position in response to a command. A controller is in communication with the steering system and the first and second sensors and is configured to provide the command based upon one of the first and second signals. The controller is configured to use the first signal if the first sensor provides a desired lane marker confidence. The controller is configured to switch to the second sensor and use the second signal if the first sensor cannot provide the desired lane marker confidence and the second sensor can provide the desired lane marker confidence and a predetermined time has not been exceeded.

In a further embodiment of any of the above, the first sensor is at least one of a camera sensor, radar sensor, infrared sensor and LIDAR sensor.

In a further embodiment of any of the above, the first sensor is an integrated camera sensor and radar sensor.

In a further embodiment of any of the above, the first sensor is forward facing.

In a further embodiment of any of the above, the second sensor is one of a side view camera and a rear view camera.

In a further embodiment of any of the above, the first sensor cannot provide the desired lane marker confidence due to temporary failure of the first sensor.

In a further embodiment of any of the above, the switching step includes applying a control algorithm using data from the second signal to determine the desired lane marker confidence. The switching step includes applying a filter to the data to identify lane marker edges and converting the lane marker edges to a vehicle coordinate system. The switching step includes determining whether the lane marker edges in the vehicle coordinate system are similar to previously provided data from the first sensor.

In a further embodiment of any of the above, steering control of the vehicle is returned if the step of controlling the vehicle lane position based upon the second signal is not performed within the predetermined time.

In a further embodiment of any of the above, the vehicle lane position is not controlled based upon the first signal while controlling the vehicle lane position based upon the second signal.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
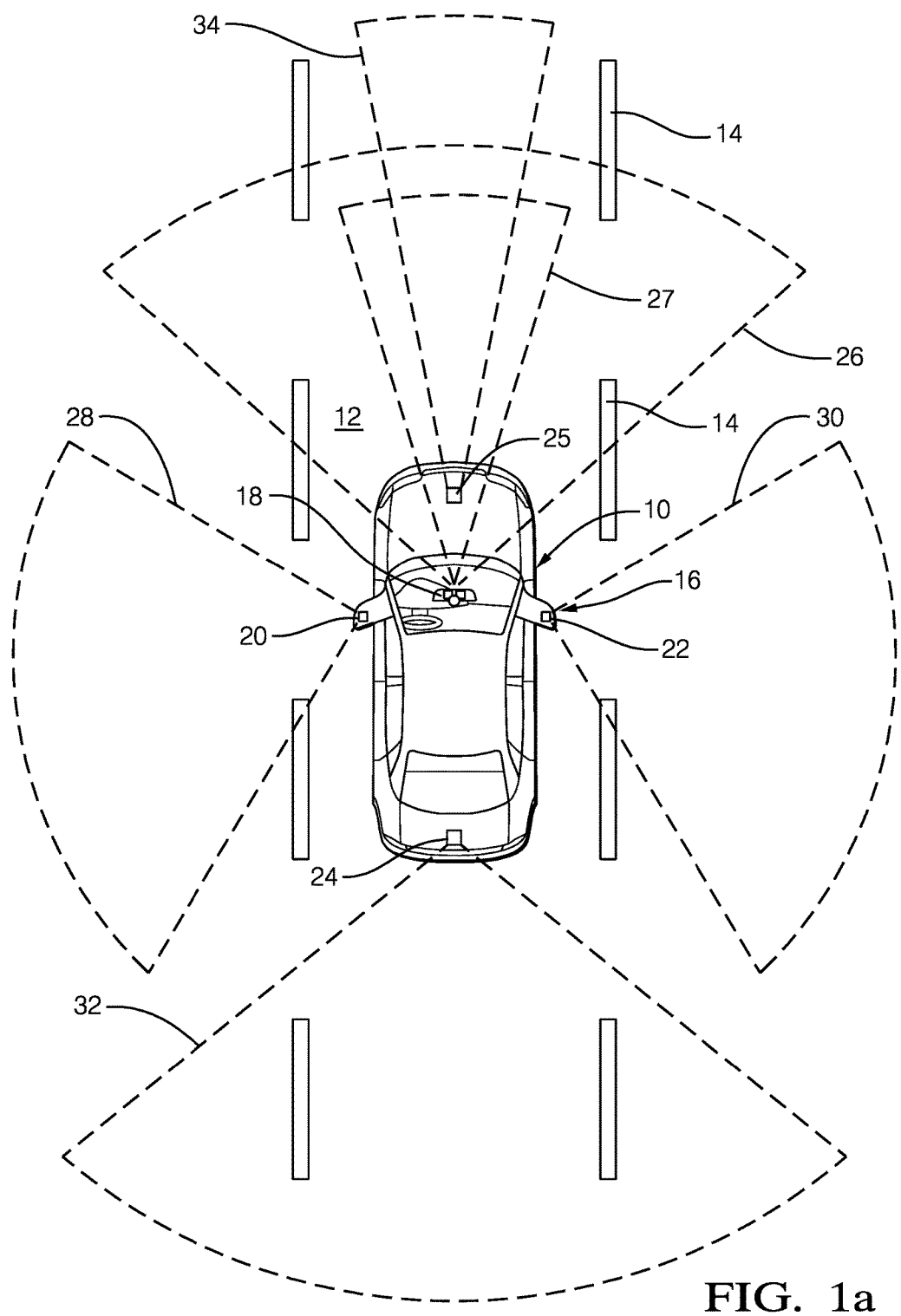
FIG. 1A is a schematic elevational view, or "bird's-eye-view," of a vehicle with an environmental sensing system of the type used in lane keeping or autonomous vehicle control.
Figure 1B:
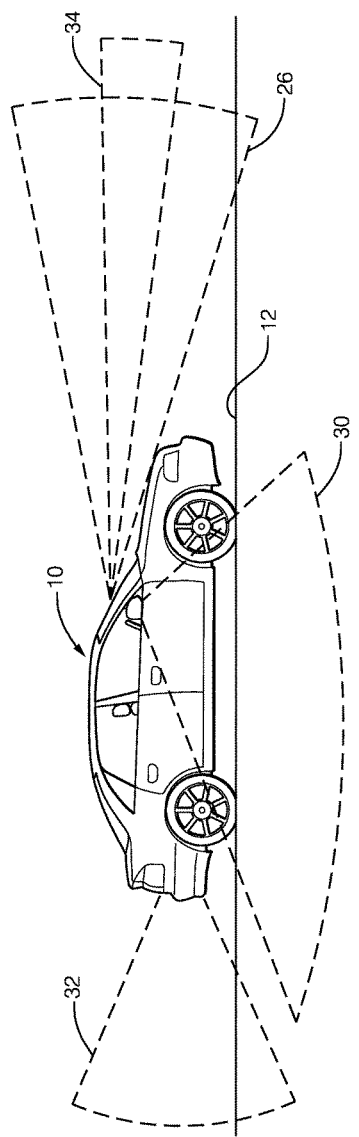
FIG. 1B is a schematic side view of the vehicle shown in FIG. 1A.

Schematic views of a vehicle 10 traveling down a road are shown in FIGS. 1A and 1B. The vehicle 10 includes an environmental sensing system 16 used to detect lane markers 14 that define a lane 12 of the road. The disclosed environmental sensing relates to lane sensing, blind spot sensing, and other vehicle active safety sensing. During operation, the vehicle's lane position is detected and, when sufficiently reliable data is obtained, the vehicle is maintained within the lane using little or no steering input from the driver for such features as Lane Keep Assist (LKA), Lane Centering (LC), Traffic Jam Assist (TJA) and/or fully autonomous control of the vehicle.

In one embodiment, the environmental sensing system 16 includes first, second, third and fourth sensors 18, 20, 22, 24 respectively providing first, second, third and fourth "bird's-eye-views" or signals 26, 28, 30, 32. The sensors are used to identify the lane markers 14 by detecting the reflection from the paint on the road or Bott's dots.

Figure 2:
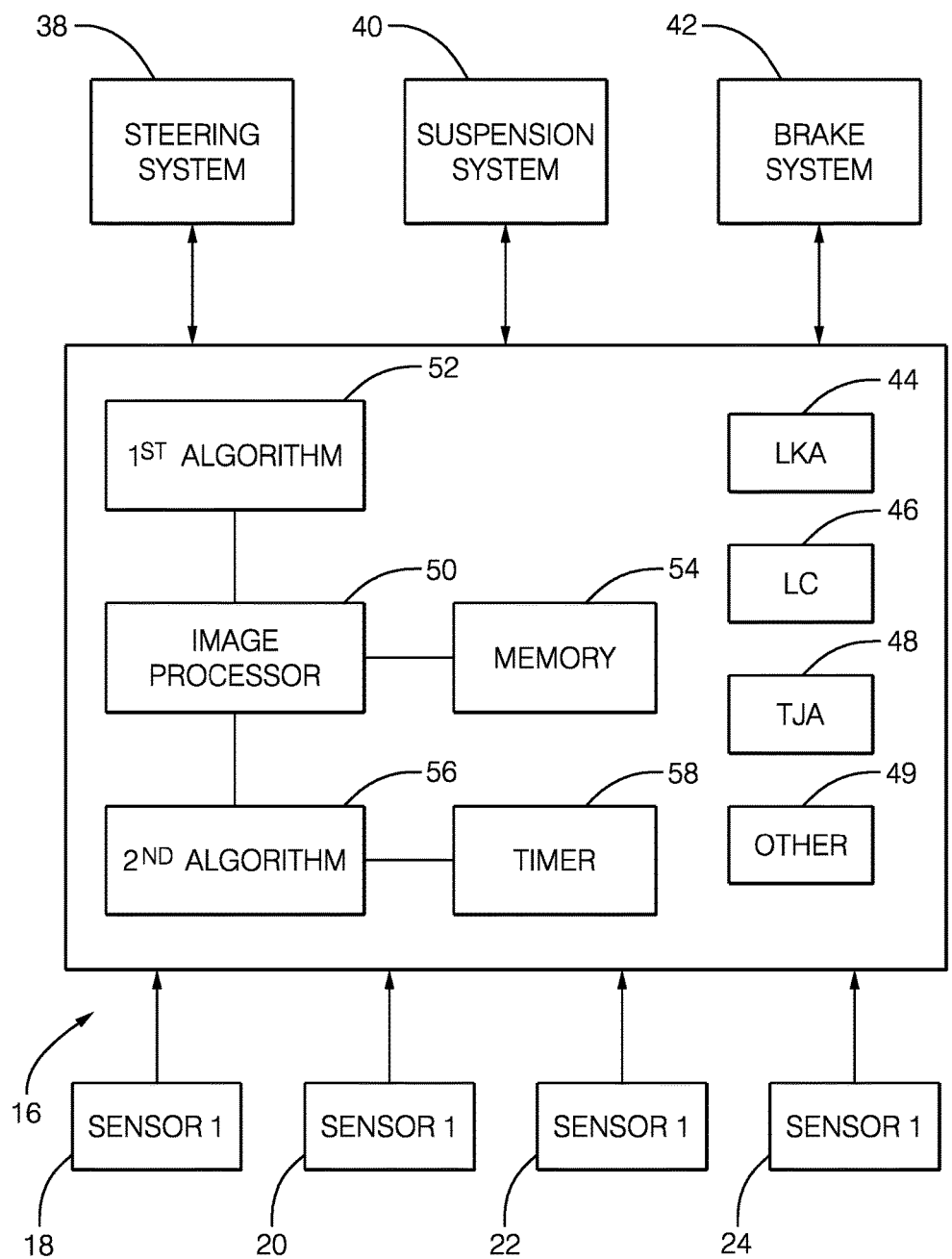
FIG. 2 is a schematic view of the environmental sensing system.

In one example, the first sensor 18 is a forward facing integrated camera and radar sensor (RACam), disclosed in U.S. Pat. No. 8,604,968 entitled "INTEGRATED RADAR-CAMERA SENSOR," issued on Dec. 10, 2013 and U.S. Pat. No. 9,112,278 entitled "RADAR DEVICE FOR BEHIND WINDSHIELD INSTALLATIONS," issued Aug. 18, 2015. The radar sensor in the first sensor 18 also provides a radar signal 34. In one example, the first sensor 18 may be provided at the front side of the rear view mirror and directed through the windshield. The second and third sensors 20, 22 are respectively left and right side cameras, which may be arranged in the side view mirrors or elsewhere. The fourth sensor 24 may be provided by the vehicle's back-up camera, for example. More or fewer sensors can be used, and the sensor can be arranged differently than shown. For example, another sensor 25 may be provided on the vehicle's hood or front bumper to provide another front field of view signal 27, which can be used to detect the roadway occluded by the hood. The sensors 18, 20, 22, 24, 25 function independent of each other and provide the latest available data for LKA, LC, TJA and/or automated driving. Additionally, various types of sensors can be used, for example, a radar sensor, an infrared sensor and/or a LIDAR sensor. The signals may be different than shown depending upon the type of sensor An example environmental sensor system 16 is shown schematically in FIG. 2. A controller 36 is in communication with the first, second, third and fourth sensors 18, 20, 22, 24. A steering system 38, suspension system 40 and/or brake system 42 is also in communication with the controller 36 and are used for partially or fully autonomous control of the vehicle 10 during operation. A LKA module 44, LC module 46, TJA module 48, and/or other module 49 are used to command the steering system 38, suspension system 40 and/or brake system 42 and achieve a desired vehicle lane position based upon the detected vehicle lane position from the controller 36. One or more of these modules 44, 46, 48, 49 are incorporated into a fully autonomous vehicle control and also provide Lane Departure Warning (LDW) functionality.

The controller 36 includes an image processor 50 that receives the signals from the first sensor 18, which is the primary sensor for vehicle lane position detection. The environmental sensing system 16, in order to reliably determine the vehicle lane position, detects the following parameters using the first sensor 18: 1) the distance of the left and right lane markers from the center of the host vehicle with respect to a vehicle coordinate system (VCS), 2) the distance of what the system determines is the center of the left and right lane markers (which would be the ideal path of the vehicle ignoring driver preference), 3) the rate of change of both lane markers with respect to the host vehicle, 4) the curvature of the lane markers, and 5) the rate of change of curvature of the lane markers. This data can be expressed in the following polynomial, which provides a first algorithm 52:

$$y = A_0 + A_1 x + A_2 x^2 + A_3 x^3 \qquad \text{Equation 1.}$$

One shortcoming of using a camera for vehicle lane position detection occurs when the camera faces into the sun or otherwise cannot "see" the lane markers. At times when the camera is directly facing the sun, for example, the detection of lane markers is compromised (inability to detect, detection intermittent, and/or low confidence detections) because the image sensor is over-saturated by the bright sunlight causing camera "drop-outs." At low confidences due to poor lane markers the coefficients ($A_0$, $A_1$, $A_2$, $A_3$) in Equation 1 will still be present, but when facing the sun, these coefficients will not report any values. At these times some prior art systems depend heavily on the ranging sensors to achieve control and maneuver to safe-spot, which is not the best practice and is not very reliable.

Most drop-outs due to sun glare are only for a few moments. In the absence of lane data or at low confidence when facing the sun, most driver-assist or autonomous vehicle control features disengage causing the vehicle to give back control to the driver. This may occur just for an instant, which still results in handing over control to the driver, or it could continue for a few seconds where the driver has to take over control for those few seconds till the system regains control.

The disclosed environmental sensing system 16 and method 60 (FIG. 3) uses a second algorithm 56 associate with a second sensor (e.g., one of the second, third or fourth sensors 20, 22, 24) and a timer 58. This second sensor will generally not be facing in the same direction as the primary sensor, so should not be significantly impacted by sun glare, or are sensors which are impervious to the sun and function independent of the sun.

Figure 3:
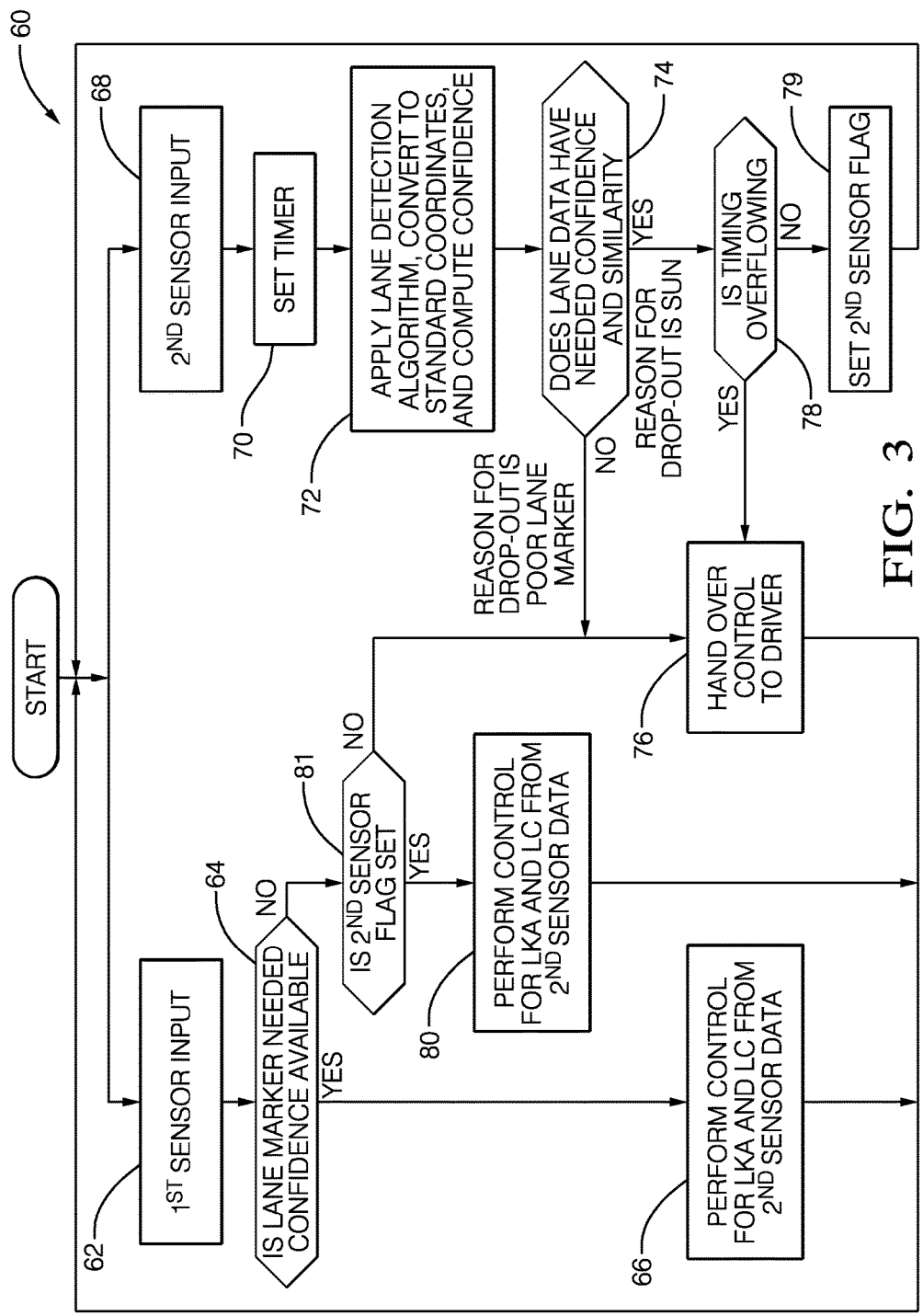
FIG. 3 is a flow chart illustrating a method of sensing a vehicle environment using the environmental sensing system shown in FIG. 2.

Referring to FIG. 3, data is gathered from the first or primary sensor and the second sensor in parallel. The first sensor is used to detect vehicle lane position (block 62). If the needed lane marker confidence is available (block 64), then the vehicle can be controlled to provide partially or fully autonomous vehicle control (block 66). If the needed lane marker confidence is not available (block 64), then the system switches to relying upon the second sensor data to detect vehicle lane position (block 68). In this manner, the second sensor reduces drop-outs due to glare as the second sensor is not directly facing the horizon and the sun but rather the area on the road just next to the vehicle (left, right or rear). Of course, the second sensor can be used for first sensor failures or inaccuracies due to other reasons. Data from the second sensor should sufficiently encompasses the lane markers next to the vehicle and, depending on the sensor, to some extent even the front of the vehicle.

The second algorithm 56 is used for the second sensor, which may be the same as the first algorithm 52 that is used for the first sensor. The timer 58 clocks the duration for which the first sensor is unavailable or dropped-out (block 70). The pixels of the 2D images indicating the edges are projected to a "real-world" global coordinate system, and the confidence is computed (block 72). If desired, one or more filters, such as a Canny filter or a Sobel filter, is used detect the edges of the lane markers from the data supplied by the second sensor.

In addition to evaluating whether the needed lane marker confidence is available, the data is also evaluated to determine if there is sufficient similarity to data previously provided by the first sensor (block 74). Sufficient similarity should exist if the lane markers detected by the second sensor are generally where they would be expected based upon the data provided by the first sensor before it became unavailable. If sufficient confidence and similarity does not exist, then control is returned to the driver (block 76). Control is also returned to the driver even if sufficient confidence and similarity exist if a predetermined time has been exceeded (block 78). If sufficient confidence and similarity exist and the predetermined time has not been exceed, then a second sensor flag is set (block 79), which indicates that the second sensor data is reliable and can be used if the first sensor drops out.

The predetermined time is stored in memory 54 and may correspond to a few fractions of a second or a few seconds based upon best practices for the situation and the degree of data reliability. This data is obtained empirically, for example, based upon sensor range for various vehicle speeds that are known to provide sufficient accuracy for the predetermined time. The data reliability to an extent is derived from the algorithm, which determines from the level of accuracy if the reason for a drop-out was poor lane markers visibility or a sensor artifact (poor sensor performance, as a result of sensor limitation, and/or unable to filter out environmental effects). Thus, in the event of a first sensor drop out, if sufficient confidence and similarity exist and the predetermined time has not been exceeded (e.g., second sensor flag is set; block 81), then the vehicle is controlled using the data from the second sensor (block 80).

Since the second sensor range is substantially less than first sensor 18 (e.g., RACam) and has only instantaneous current lane/line markers, data about lane markers in front of the vehicle may not be available, and hence the control strategy may change significantly. For example, instead of using a feed-forward PI controller used with the first sensor 18, a simple proportional control could be performed to maintain the vehicle within the center on the two lines reported by the second sensor.

Using this lane and curvature data, these values can be substituted to the 3rd degree polynomial in the second algorithm 56 to provide partially or fully autonomous vehicle control. In the absence of first sensor data, the values from the second sensor should provide the confidence values along with similarity values sufficient to perform partially or fully autonomous vehicle control for the short instants that data is unavailable. However, the first sensor 18 is the primary data source for vehicle control, and the second sensor is only employed in case of drop-outs. Thus, there is a time interval for which control can be made with the second sensor after which the environmental sensing system 16 warns the driver to take control to avoid abuse.

The controller 36 may include a processor and non-transitory memory 54 where computer readable code for controlling operation is stored. In terms of hardware architecture, such a controller can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 36 may be a hardware device for executing software, particularly software stored in memory 54. The processor can be a custom made or commercially available processor, a central processing unit (CPU), an auxiliary processor among several processors associated with the controller 36, a semiconductor based microprocessor (in the form of a microchip or chip set) or generally any device for executing software instructions.

The memory 54 can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory 54 may incorporate electronic, magnetic, optical, and/or other types of storage media. The memory 54 can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The input/output devices that may be coupled to system I/O Interface(s) may include input devices, for example, but not limited to, a scanner, microphone, camera, proximity device, etc. Further, the input/output devices may also include output devices, for example but not limited to a display, etc. Finally, the input/output devices may further include devices that communicate both as inputs and outputs, for instance but not limited to, a modulator/demodulator (for accessing another device, system, or network), a radio frequency (RF) or other transceiver, a bridge, a router, etc.

When the controller 36 is in operation, the processor can be configured to execute software stored within the memory 54, to communicate data to and from the memory 54, and to generally control operations of the computing device pursuant to the software. Software in memory 54, in whole or in part, is read by the processor, perhaps buffered within the processor, and then executed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of sensing an environment of a vehicle, the method comprising the steps of:
   controlling a vehicle lane position based upon a first signal from a first sensor;
   determining whether the first sensor cannot provide a desired lane marker confidence; switching from the first sensor to a second sensor based on the determination that the first sensor cannot provide a desired lane marker confidence; and
   after determining that the first sensor cannot provide a desired lane marker confidence; controlling the vehicle lane position based upon the second signal from the second sensor, provided that the second sensor can provide the desired lane marker confidence and a predetermined time has not been exceeded.

2. The method according to claim 1, wherein the first sensor is at least one of a camera sensor, radar sensor, infrared sensor and LIDAR sensor.

3. The method according to claim 2, wherein the first sensor is an integrated camera sensor and radar sensor.

4. The method according to claim 1, wherein the first sensor is forward facing.

5. The method according to claim 4, wherein the second sensor is one of a side view camera and a rear view camera.

6. The method according to claim 1, wherein the first sensor cannot provide the desired lane marker confidence due to glare on the first sensor.

7. The method according to claim 1, wherein the switching step includes applying a control algorithm using data from the second signal to determine the desired lane marker confidence.

8. The method according to claim 7, wherein the switching step includes applying a filter to the data to identify lane marker edges, and converting the lane marker edges to a coordinate system.

9. The method according to claim 7, wherein the switching step includes determining whether the lane marker edges in the coordinate system are similar to previously provided data from the first sensor.

10. The method according to claim 1, comprising the step of returning steering control of the vehicle to the driver provided that the step of controlling the vehicle lane position based upon the second signal is not performed within the predetermined time.

11. The method according to claim 1, wherein the vehicle lane position is not controlled based upon the first signal while controlling the vehicle lane position based upon the second signal.

12. An environmental sensing system relating to vehicle lane position, comprising:
    a first sensor configured to provide a first signal indicative of a vehicle lane position;
    a second sensor configured to provide a second signal indicative of the vehicle lane position;
    a steering system configured to achieve a desired lane position in response to a command; and
    a controller in communication with the steering system and the first and second sensors and configured to provide the command based upon one of the first and second signals, the controller configured to use the first signal if the first sensor provides a desired lane marker confidence, the controller configured to switch to the second sensor and use the second signal if the first sensor cannot provide the desired lane marker confidence and the second sensor can provide the desired lane marker confidence and a predetermined time has not been exceeded.

13. The system according to claim 12, wherein the first sensor is at least one of a camera sensor, radar sensor, infrared sensor and LIDAR sensor.

14. The system according to claim 13, wherein the first sensor is an integrated camera sensor and radar sensor.

15. The system according to claim 12, wherein the first sensor is forward facing.

16. The system according to claim 15, wherein the second sensor is one of a side view camera and a rear view camera.

17. The system according to claim 12, wherein the first sensor cannot provide the desired lane marker confidence due to temporary failure of the first sensor.

18. The system according to claim 12, wherein the switching step includes applying a control algorithm using data from the second signal to determine the desired lane marker confidence, the switching step includes applying a filter to the data to identify lane marker edges, and converting the lane marker edges to a vehicle coordinate system, and the switching step includes determining whether the lane marker edges in the vehicle coordinate system are similar to previously provided data from the first sensor.

19. The system according to claim 12, comprising the step of returning steering control of the vehicle if the step of controlling the vehicle lane position based upon the second signal is not performed within the predetermined time.

20. The system according to claim 12, wherein the vehicle lane position is not controlled based upon the first signal while controlling the vehicle lane position based upon the second signal.

* * * * *